Aug. 25, 1925.　　　　　　　　　　　　　　　　　　　　1,550,812
J. A. JENSEN
CONTROL MEANS FOR EMERGENCY VALVES OF VEHICLE TANKS
Filed Sept. 22, 1924
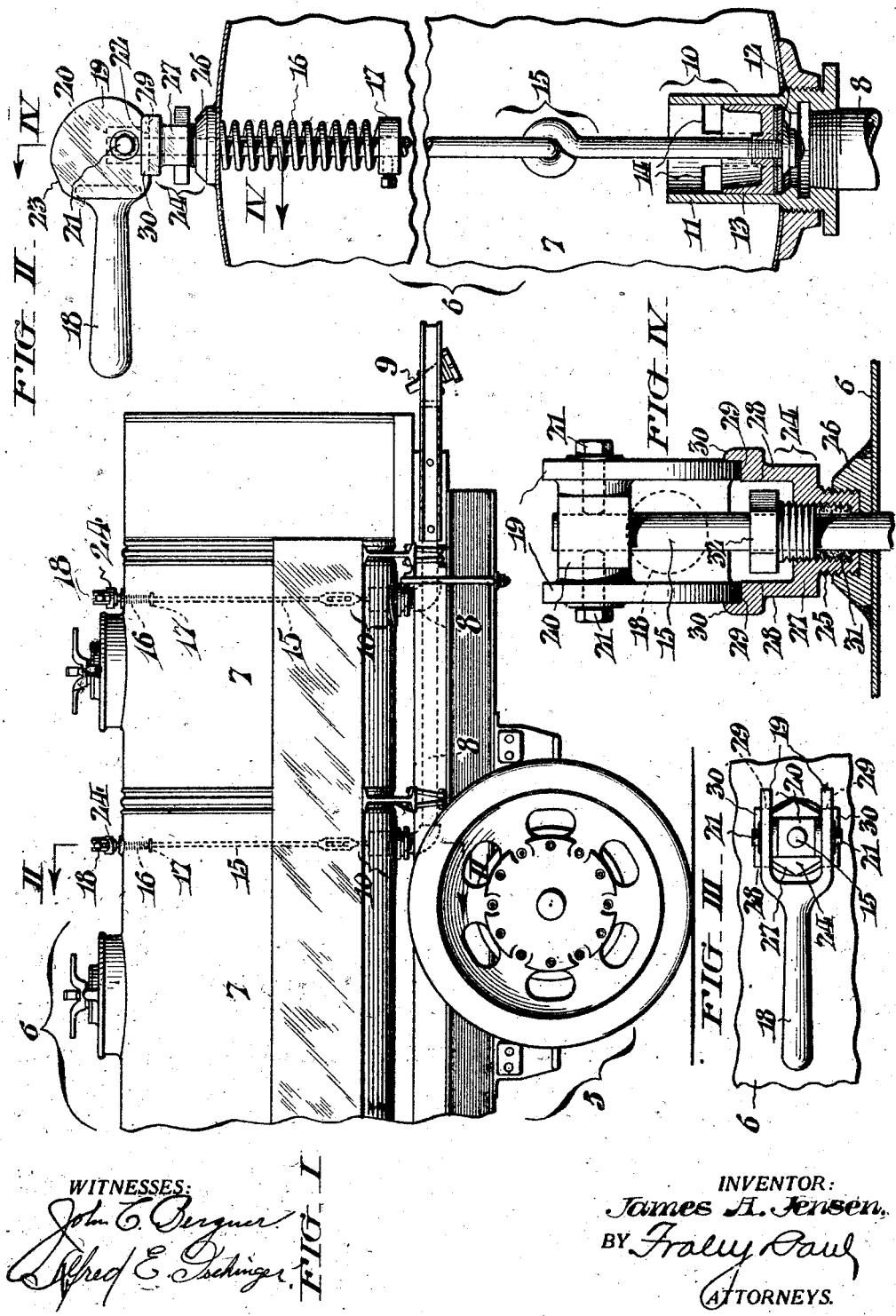
WITNESSES:
INVENTOR:
James A. Jensen,
BY
ATTORNEYS.

Patented Aug. 25, 1925.

1,550,812

UNITED STATES PATENT OFFICE.

JAMES A. JENSEN, OF PHILADELPHIA, PENNSYLVANIA, ASSIGNOR TO QUAKER CITY IRON WORKS, OF PHILADELPHIA, PENNSYLVANIA, A CORPORATION OF PENNSYLVANIA.

CONTROL MEANS FOR EMERGENCY VALVES OF VEHICLE TANKS.

Application filed September 22, 1924. Serial No. 739,058.

*To all whom it may concern:*

Be it known that I, JAMES A. JENSEN, a citizen of the United States, residing in Philadelphia, in the county of Philadelphia and State of Pennsylvania, have invented certain new and useful Improvements in Control Means for Emergency Valves of Vehicle Tanks, whereof the following is a specification, reference being had to the accompanying drawings.

This invention relates to means for controlling emergency valves associated with tanks of vehicles employed in transporting liquid commodities such as fuel oils and the like, and is directed toward attainment of the utmost simplicity in mechanism for controlling valves of the type referred to,—both with regard to construction and operation,— to the end of facilitating assembling, and insuring against derangement in long continued usage.

These and other advantages accruing to my invention will become readily apparent from the detailed description hereinafter of a typical embodiment shown in the drawings, whereof Fig. I is an elevation of the rear end of a tank vehicle equipped with my improved emergency valve control means.

Fig. II is a fragmentary cross sectional view through the tank of the vehicle taken as indicated by the arrows II—II in Fig. I.

Fig. III is a detail plan view of the valve control means; and

Fig. IV is a detail sectional illustration on a larger scale than the others taken as indicated by the arrows IV—IV in Fig. II.

The vehicle partly shown in Fig. I is of standard construction, comprising a chassis 5 whereon is mounted a tank structure 6, which, in this instance, is composed of a number of separate tank units 7—7. These units 7 are arranged to be drained, after usual practice, through individual outflow pipes 8—8 leading from openings in the tank bottom to the rear end of the vehicle, where they are provided with the customary manually-operable faucets 9. With each of the tank units 7 is also associated an emergency valve 10, the same being interposed in the drain pipe 8 at the juncture of the latter with the tank wall. From Fig. II it will be noted that the emergency valve 10 embodies a cylindric shell 11 with an internal annular seat 12 for a piston 13, and having through its side walls a series of ports 14, which, when said piston is elevated, are uncovered to permit efflux of the contents of the corresponding tank unit 7 into the drain pipe 8 leading therefrom. The piston 13 is appended to the lower end of a stem 15 extending vertically upward through the tank unit 7, and is normally held in the closed position shown by a helical spring 16 in compression between the top of the tank and a collar 17 on said stem 15.

Having given, by way of introduction, a brief outline of a typical vehicle tank and its general equipment, I will now proceed to describe the salient features of my improved emergency valve control means. This means, includes a control handle 18 having one extremity thereof bifurcated as at 19 to provide a clevis or fork for receiving a square collar 20 on the upper protruding end of the valve stem 15 wherewith pivotal connection is made by aid of axially aligned cap bolts 21 entering from opposite sides of the bifurcation 19 of the handle. The side cheeks of the bifurcation 19 will be observed as substantially circular except for flattened portions 22, 23, but eccentric with respect to the pivotal axis of the handle 18 so as to serve, collectively considered, as a rotary cam to actuate the emergency valve 10 in a manner to be presently explained. In its action the control handle 18 cooperates with a fitting 24 that is characterized by a hollow externally threaded shank 25 whereby it may be screwed into a flange annulus 26 welded or otherwise permanently secured on the top of the tank wall. The outer end of the shank 25 is integrally extended laterally to provide a head 27 which is preferably made of polygonal contour as shown in Fig. III, to enable use of a wrench in attaching the fitting 24 to the tank. At opposite sides of the head 27 are upstanding lugs 28 that afford horizontal rest ledges or reacting surfaces 29 for the opposite bifurcations or cam cheeks 19 of the control handle 18. As a means to hold the cam cheeks 19 of the handle 18 to the ledges or reacting surfaces 29 and at the same time to determine the plane of movement of the control handle 18 the upstanding lugs 28 are formed with guard flanges 30 parallel to each other, as may be observed from Fig. III, in order to function in the manner described. The hollow of the fitting 28 provides a stuffing box 31 for passage of the valve stem 15, a gland 32 being screwed into the same from above to compress the packing in the customary manner. Ample clearance is provided through liberal spacing of the lugs 28, as shown, to permit ready access to the gland 32 for the purposes of applying or removing the same in making replacements of the packing.

In operation as the control handle 18 is turned clockwise through approximately one hundred and eighty degrees from the position of Fig. II, the rotary cam end 19, by virtue of the eccentricity of its edges with regard to the pivotal axis of said handle and through cooperation with the reacting ledges 29 of the fitting 24, will effect lifting of the stem 15 with the attached piston 14 and open the emergency valve 10. When this motion of the handle 18 is fully consummated, the flattened portions 23 of the cam cheeks of the handle 18 will be held firmly against the reacting ledges 29 under the action of the compression spring 16 and the valve 10 thereby maintained open. After the desired quantity is drawn from the tank 6, or more accurately speaking, from the tank unit 7 under control of the drain faucet 9, the emergency valve 10 may be closed by swinging the control handle 18 in the reverse direction to the position shown in the illustrations in which position it will be maintained through joint cooperation between the flattened portions 22 of the cam cheeks and the reacting ledges 29, the guard flanges 30 acting, in each instance of operation, not only to prevent the rotary cam from riding off the ledges, but restricting movement of the handle 18 to a predetermined plane.

Having thus described my invention, I claim:

1. In control means for emergency valves of vehicle tanks including a pivoted handle having a rotary valve-actuating cam; the combination of a fitting adapted to be secured in the tank wall, said fitting providing a stuffing box for passage of the valve stem, and a reacting surface for the cam of the control handle.

2. In control means for emergency valves of vehicle tanks including a pivoted control handle having a rotary valve-actuating cam; the combination of an integrally-formed fitting adapted to be secured in the tank wall, said fitting providing a stuffing box for passage of the valve stem, a reacting surface for the cam of the control handle, and means to hold the cam to said surface and to restrict the handle to movement in a definite plane.

3. In control means for emergency valves of vehicle tanks including a pivoted control handle having a rotary valve-actuating cam; the combination of an integrally-formed fitting adapted to be secured in the tank wall, providing a stuffing box for passage of the valve stem, a reacting surface for the cam of the control handle, and guard flanges at opposite sides of said surface to hold the cam thereto and to restrict the handle to movement in a definite plane.

4. In control means for emergency valves of vehicle tanks including a pivoted control handle having a rotary valve-actuating cam; the combination of an integrally-formed fitting having a hollow externally-threaded shank adapted to be screwed into the tank wall and to serve as a stuffing box for passage of the valve stem, a head at the outer end of the shank, lugs outstanding from opposite sides of the head providing reacting ledges for the cam of the control handle, and parallel guard flanges respectively at the outer edges of the lugs to hold the cam to the reacting ledges and to restrict the control handle to movement in a definite plane.

5. As a new article of manufacture an integrally formed fitting having a hollow externally threaded shank adapted as a stuffing box, a head on the outer end of the shank, lugs upstanding from opposite sides of the head affording reacting ledges, and parallel guard flanges at the outer edges of the lugs.

In testimony whereof, I have hereunto signed my name at Philadelphia, Pennsylvania, this 18th day of of September, 1924.

JAMES A. JENSEN.